(No Model.) 2 Sheets—Sheet 1.

A. R. SELDEN.
IRONING MACHINE.

No. 598,233. Patented Feb. 1, 1898.

Witnesses:
W. D. Ellwanger,
D. W. Bush

Inventor.
Arthur R. Selden
by Howard L. Osgood
Attorney.

(No Model.) 2 Sheets—Sheet 2.

A. R. SELDEN.
IRONING MACHINE.

No. 598,233. Patented Feb. 1, 1898.

Witnesses.
W. D. Ellwanger
C. P. Lyon

Inventor.
Arthur R. Selden
by
Howard L. Osgood
Attorney.

UNITED STATES PATENT OFFICE.

ARTHUR R. SELDEN, OF ROCHESTER, NEW YORK.

IRONING-MACHINE.

SPECIFICATION forming part of Letters Patent No. 598,233, dated February 1, 1898.

Application filed March 16, 1896. Serial No. 583,484. (No model.)

*To all whom it may concern:*

Be it known that I, ARTHUR R. SELDEN, a citizen of the United States, and a resident of the city of Rochester, in the county of Monroe and State of New York, have invented certain new and useful Improvements in Ironing-Machines, of which the following is a specification, reference being had to the accompanying drawings, in which—

Figure 1:
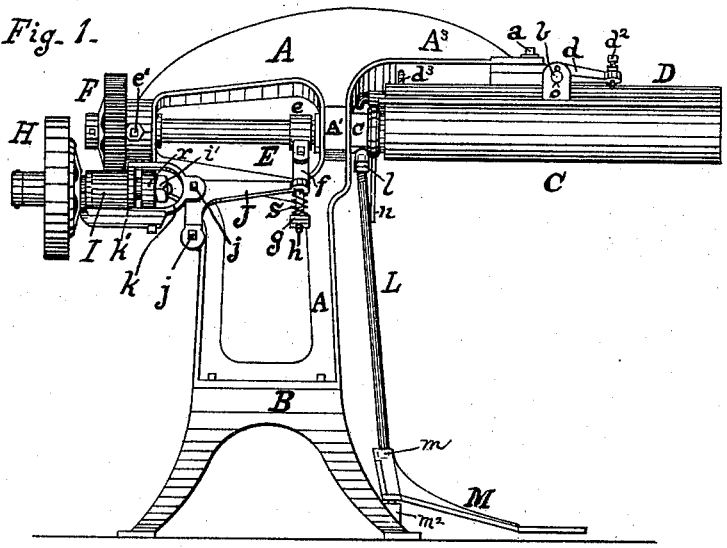
Figure 2:
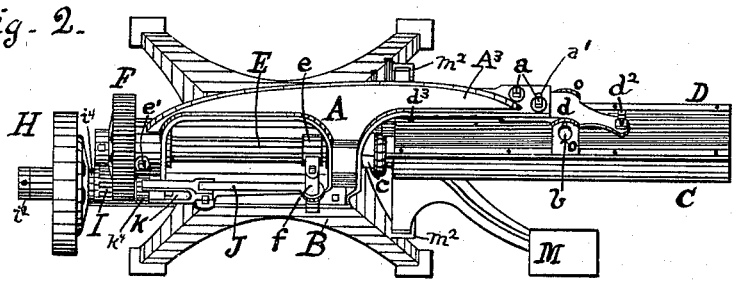
Figure 3:
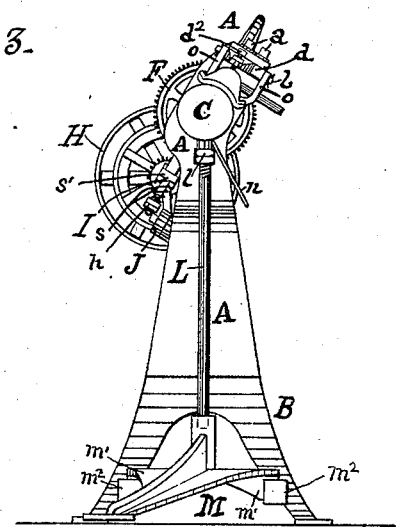
Figure 4:
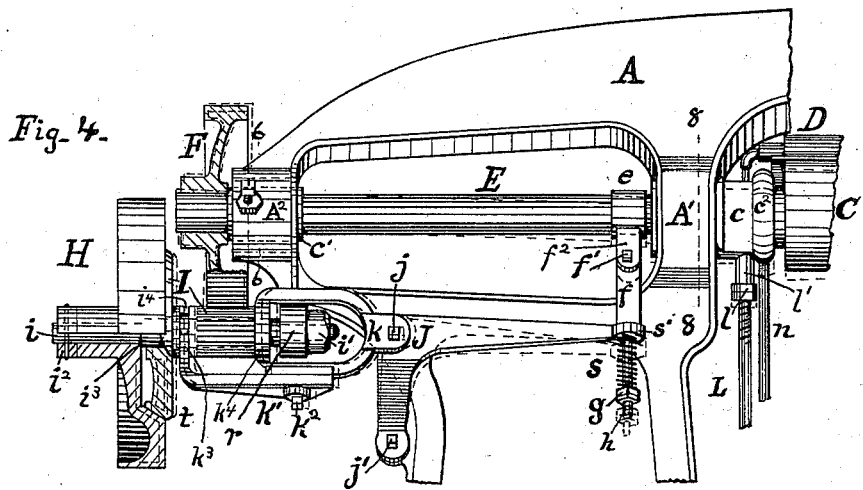
Figure 5:
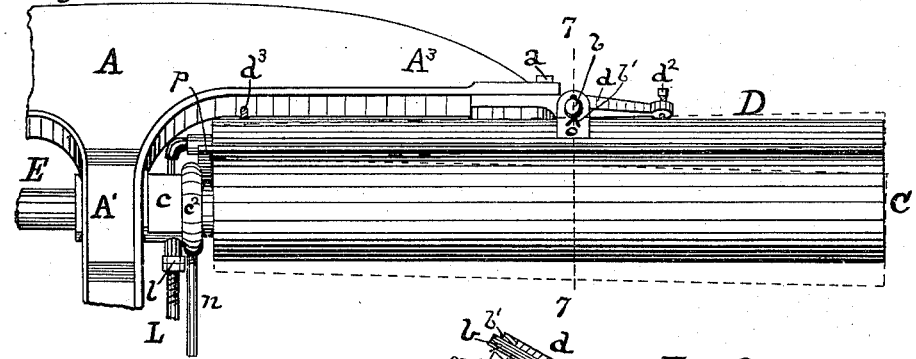
Figure 6:
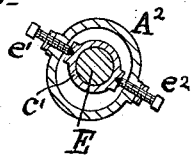
Figure 7:
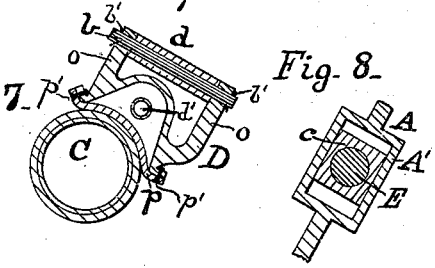
Figure 8:
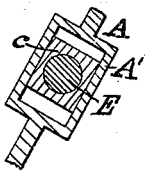
Figure 9:
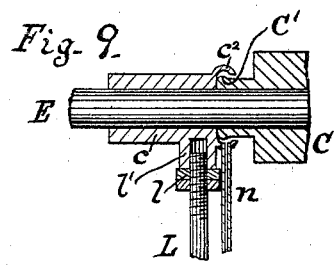

Figure 1 is a side elevation of an ironing-machine embodying my invention. Fig. 2 is a top plan view thereof. Fig. 3 is an end elevation thereof. Fig. 4 is a partial side elevation showing the driving mechanism. Fig. 5 is a partial side elevation showing the roller and my means for attaching the heated iron to the main frame. Fig. 6 is a transverse section through the main frame on the dotted line 6 6 of Fig. 4. Fig. 7 is a transverse section through the heated iron and the roll on the line 7 7 of Fig. 5. Fig. 8 is a transverse section through the main frame on the line 8 8 of Fig. 4, and Fig. 9 is a partial perpendicular section through the main bearing-box $c$ and the connected parts.

My invention relates to ironing-machines in which a rotating cloth-covered ironing-roller, supported and operated from one end thereof, is caused to travel to and from a concave heated ironing-surface.

My invention consists in the devices and arrangements of parts hereinafter described and claimed, and illustrated in the accompanying drawings.

A is the main frame of the machine, and B is a standard for supporting the same, which is fastened rigidly to said main frame.

At A' in the main frame A there is a rectangular opening (see Fig. 8) in which the square end of the main bearing-box $c$ is guided to have a motion to and from the heated iron D.

At $A^2$ (see Figs. 4 and 6) an oval opening is formed in the frame A, within which a pivoted box for the main shaft E has an oscillating movement on the pivots $e'$ $e^2$, carried by said main frame.

E is the main roller-shaft, upon one end of which the roll C is rigidly fastened. The shaft E passes through and revolves in the boxes $c$ and $c'$, and upon the end of the shaft opposite to that upon which the roll C is fixed is fastened a gear-wheel F. To a suitable boss $r$ on the main frame A there is rigidly fastened, as by the nut $i'$, a short bearing-shaft $i$. A friction-pulley H revolves freely on the end of the shaft $i$, being held in place by shoulder $i^3$ upon the shaft and a collar $i^2$ on said shaft. An elongated pinion I revolves freely on the shaft $i$ between the boss $r$ and the pulley H. This pinion meshes with the gear F, and is also capable of an endwise motion on said shaft $i$, effected as herein described.

The pinion I has an enlarged friction-surface, (shown as beveled at $t$, Fig. 4,) and the pulley H has a corresponding surface adapted to fit upon the friction-surface of the pinion, so that when endwise motion toward the left in Fig. 4 is given to the pinion I and the friction-surfaces of the pinion and pulley are forced into close contact rotary motion is communicated to the pinion by the revolution of the constantly-driven pulley H. The pinion I has a groove $i^4$ on its hub, into which the bifurcated end or yoke $k^3$ of a shifter fits loosely. On the shaft E, inside the frame and near the sliding bearing-box $c$, I place a collar $e$, provided on its lower side with lugs $f^2$, to which is fastened a pressure-link $f$ by a pivot $f'$. A rod $h$ is fastened to the pressure-link $f$ and is threaded at its lower end to take the set-nuts $g$, (see Fig. 4,) and a spring $s$ is coiled upon the rod $h$ between the nuts $g$ and the end $s'$ of a bell-crank lever J, whereby the strength of the spring determines, as hereinafter described, the amount of pressure put upon the friction-surfaces at $t$. The bell-crank lever J is pivoted at the end of its short arm to the main frame at $j'$. At the bend of the lever J there is pivoted, as by the bolt $j$, a shifter-link $k$, and the end $s'$ of the long arm of the lever J is perforated, and the rod $h$ passes loosely through the perforation. The link $f$ comes in contact with the upper side of the end $s'$ of the long arm of the lever J, and when the shaft E falls into the position shown in dotted lines in Fig. 4 the said end $s'$ is depressed, but when the shaft E is raised the pressure of the spring $s$ forces the end $s'$ upward.

The shifter-link $k$ has a sliding bearing $k^4$ on the shaft $i$, which bearing presses against one end of the pinion I. The link $k$ also carries the shifter $k'$, which is provided with a bifurcated end or yoke $k^3$, which fits into and around the groove or slot $i^4$ in the hub of the pinion I. The shifter $k'$ is fastened to the shifter-link $k$ by suitable means, such as the bolt $k^2$.

On the under side of the main bearing-box $c$ and outside of the main frame is placed a hollow boss $l'$, (see Fig. 9,) into which the upper end of the treadle-rod L is inserted. The lower end of the treadle-rod L is set loosely in a socket $m$ on the upwardly-projecting portion of the treadle M. The rod L carries on its upper end a pair of set-nuts $l$, which bear against the rim of the hollow boss $l'$, and thus serve to adjust the effective lift of the rod L, and consequently the amount of pressure of the roll C against the heated iron D. This arrangement of the treadle-rod L and treadle M produces a toggle action, and consequently a powerful effect. The treadle M has two downwardly-projecting lugs $m'$, (see Fig. 3,) which fit into recesses in the lugs $m^2$ $m^2$ on the standard B, said recesses being so formed as to allow oscillation of the treadle.

The upper part of the main frame A is extended, as at $A^3$, so far as to constitute a support for the heated iron D at about the middle point of the latter. The heated iron D is formed of a hollow box, open on the under side, and the opening is covered by the curved plate $p$, (see Fig. 7,) which is fastened to the edges of the box, as by the rivets or bolts $p'$. The plate P is preferably made of a fine-grained metal. An arm $d$ is bolted to the end of the extension $A^3$ by bolts $a$, which pass through transverse slots $a'$, Fig. 2, in the main frame in order to allow adjustment of the arm, and consequently of the iron. Through the box of the heated iron D, I extend a burner $d'$ for the supply of gas and air necessary to give the proper flame to heat the plate $p$. At a point a little nearer the outer than to the inner end of the heated iron I provide a pair of lugs $o$ $o$, which span the arm $d$. A pin $b$ passes through the lugs $o$ $o$ and through the arm $d$, thus permitting the heated iron to oscillate upon said pin. The pin $b$ is held in place by small cotter-pins $b'$, passing through its ends outside the lugs $o$ $o$. In the projecting end of the arm $d$ is a set-screw $d^2$, extending downward toward the upper surface of the iron D, and forms a stop for limiting the upward movement of the outer end of the iron, and a set-screw $d^3$ in the arm $A^3$, near the inner end of the heated iron, limits the upward movement of said inner end and also provides means, in combination with the set-screw $d^2$, for locking the iron in any angular position which may be deemed desirable. As the lugs $o$ $o$ are somewhat nearer the outer end than the inner end of the iron, the inner end is the heavier, and when the roller C is not in contact with the iron the inner end thereof drops as far as the set-screw $d^2$ will permit, thus leaving a larger opening between the outer ends of the roller C and iron D than would exist if the iron were immovable, and thus giving a larger opening for the insertion of the work. It will be noticed particularly in Fig. 5 that the inner end of the plate $p$ extends beyond the inner end of the roll C for the following purpose: The inner end of the iron D is open in order to let out the gases from the burner $d'$. The extension of the plate $p$ just mentioned prevents any flame or gases from impinging upon the covering of the roller C or upon the work thereon and thus prevents injury either to the roller or the work.

On the end of the main bearing-box $c$ I place a hollow annular oil-receptacle $c^2$, (shown most clearly in Fig. 9,) surrounding the shaft E and provided with a drainage-pipe $n$ to carry away surplus oil and to protect the goods or work from being smeared. The roller C has an extension $C'$, which extends within the receptacle $c^2$ and is provided with an enlarged end which causes the oil to drop therefrom and not to run toward the roller.

The operation of the machine is as follows: After the heated iron D is brought to a suitable temperature and the roller and iron are in the position shown in dotted lines in Fig. 5 the goods are placed between the roller and the iron. The treadle M is depressed, as shown in Figs. 1 and 2, the toggle connection with the treadle M is straightened, and the roller C is lifted into a position to press the goods against the heated iron. At the same time the link connection, composed of the link $f$, rod $h$, and spring $s$, raises the long arm of the bell-crank lever J, thereby causing it to oscillate about its pivotal point $j'$ and to move the shifter-link $k$ toward the left in Fig. 4, and thus pressing the friction-surface of the pinion I against the friction-surface of the driving-pulley H. Motion is thereby communicated from the pulley H through the pinion I, gear-wheel F, and shaft E to the roller C. When the work is ironed and is to be removed from the machine or is to be changed in position, the treadle is allowed to rise, and the weight of the roll C causes it to drop away from the heated iron and to move the lever J, so as to disengage the friction-surface of the pinion I and pulley H, thus stopping the motion of the roller.

It is obvious that the pivoting of the iron D on the side of its middle nearest to the outer end creates a leverage at said outer end when the inner end is moved by the pressure of the roller against it, and this leverage is very advantageous. As the most of the ironing is done by the outer end of the iron and without the leverage above described, the tendency would be to produce a loss of pressure at said outer end.

It will be seen that when the iron is in its normal tilted position and rests against the stop $d^2$ it takes this position by reason of the overweighting of the inner end of the iron, and that when goods to be ironed are placed between the iron and the roller the upward motion of the roller (which has, as usual, a padded surface) first brings it in contact with the inner or longer end of the iron. It is also obvious that a resistance to the upward movement of the roller toward the iron, which occurs at the outer end of the roller, is more difficult to overcome by force put on the treadle than when resistance is applied to the inner end of the roller. If goods are now inserted between the roller and iron and between the inner ends thereof and at the same time extend so far as to be between the outer ends of the roller and iron, the pressure exerted by the inner end of the roller and against the inner end of the pivoted iron will produce a greater leverage and pressure on the goods at the outer ends of the roller and iron than if the iron was not pivoted nearer the outer end than the inner end. By this combination of devices I produce a mechanism by which when the roller moves through the arc of a circle whose center (the pivots $e'$ $e^2$) is in a line produced from the inner end of the iron the leverage exerted by the iron produces a proper ironing pressure at a point where heretofore it has been most difficult to exert it—viz., at the outer or free end. I thus produce an effective mechanism for obtaining a sufficient ironing pressure and also reduce the amount of force which it is necessary for the operator to exert upon the treadle.

What I claim is—

1. In an ironing-machine, the combination of an oscillating iron D set on a stationary transverse pivot $b$, said iron being overweighted at one end to cause the same to have a normal tendency to oscillate in one direction, a stop $d^2$ for limiting the extent of such oscillation, a revolving roller C movable in an arc to and from said iron, whereby the overweighted end of the iron is lifted and the roller is moved against the same and the iron is brought into contact with the roller or interposed material throughout its length, means for driving said roller, and means for moving said roller to and from said iron.

2. In an ironing-machine, the combination of an oscillating iron D set on a stationary transverse pivot $b$, stops for limiting the extent of such oscillation, a revolving roller-shaft E transversely pivoted at one end and having a roller C at the other end, a gear-wheel F on the end of the shaft E opposite to the roller C, a stud or shaft $i$ fixed to the frame of the machine and having thereon a driving-pulley H provided with a conical friction-surface, an elongated pinion I on said shaft or stud $i$ and capable of longitudinal movement thereon and having a friction-surface corresponding to and adapted to engage with the friction-surface of the pulley H, a treadle M and connections with the roller-shaft E for moving said roller C to and from said iron D, a lever J pivoted to the frame of the machine, connections between the shaft E and the lever J for moving the same when the roller is moved to or from the iron, and connections between said lever J and said pinion I for moving said friction-surfaces into and out of contact.

3. In an ironing-machine having a roller movable to and from the iron in an arc having a center produced from the inner end of the iron, an iron transversely pivoted to the frame at a point nearer to its outer end than to its inner end and movable on its pivot by the pressure of the inner end of said roller, whereby a leverage is produced by said iron against the outer end of said roller.

4. In an ironing-machine having a roller movable to and from the iron in an arc having a center produced from the inner end of the iron, an iron transversely pivoted to the frame at a point nearer to its outer end than to its inner end and overweighted at its inner end and movable on its pivot by the pressure of the inner end of said roller, whereby the movement of the roller lifts the inner end of the iron and produces an advantageous leverage at the outer end thereof.

ARTHUR R. SELDEN.

Witnesses:
E. H. MARSELLUS,
D. W. BUSH.